3,734,856
USE OF MICELLAR DISPERSIONS AS DRILLING FLUIDS
Marion O. Son, Jr., Littleton, Colo., assignor to Marathon Oil Company, Findlay, Ohio
No Drawing. Continuation-in-part of abandoned application Ser. No. 792,886, Dec. 16, 1968. This application Aug. 30, 1971, Ser. No. 176,272
Int. Cl. C10m 1/40
U.S. Cl. 252—8.5 M         8 Claims

ABSTRACT OF THE DISCLOSURE

A well drilling process is improved by using a micellar dispersion as a drilling fluid. The micellar dispersion is obtained by mixing about 10% to about 95% of a hydrocarbon with about 5% to about 40% of a petroleum sulfonate having an average equivalent weight within the range of about 350 to about 520 and then admixing with sufficient water to obtain a desired viscosity. In addition, electrolytes and/or cosurfactants can be incorporated into the micellar dispersion to obtain the desired viscosity.

CROSS REFERENCES TO RELATED APPLICATIONS

This is a continuation-in-part of application Ser. No. 792,886, filed Dec. 16, 1968, now abandoned.

BACKGROUND OF THE INVENTION

U.S. 3,308,068 to Jones teaches a composition comprised of water, diethylene-glycol monohexyl ether, petroleum alkali metal sulfonate, and a mineral oil. The sulfonates used are water insoluble, but rendered substantially water soluble by means of these diethylene-glycol monohexyl ether.

U.S. 3,252,903 to Crittendon teaches the use of a water-in-oil emulsion as a drilling fluid.

U.S. 2,775,557 to Morgan teaches a drilling mud containing a water soluble salt of an acrylic acid-acrylamide polymer.

U.S. 2,798,851 to Nelson et al. teaches the use of a water and oil emulsion as a well completion fluid.

Applicant has discovered that a well drilling process which uses a drilling fluid is improved by using a micellar dispersion as this fluid. The prior art is replete with drilling fluids consisting of various emulsions. Micellar dispersions are an improvement over emulsions in that, inter alia, they are homogeneous and thermodynamically stable, while emulsions are heterogeneous and phase unstable.

The use of micellar dispersions as drilling fluids improves cable-tool operations, e.g. during spudding operations or during the drilling of sensitive oil formations which might be damaged by rotary drilling mud or other high pressure muds. Use of these dispersions as drilling fluids also improves the drilling of wells for secondary and tertiary purposes, i.e. where high pressure muds could damage severely the reservoir rock. In addition, the micellar dispersions exhibit a solubilization action on the reservoir rock to remove wax, associated occlusions, etc.

SUMMARY OF THE INVENTION

Applicant's drilling fluid is a micellar dispersion containing 10–70% by volume hydrocarbon, 5–50% by volume aqueous medium, 5–40% by volume petroleum sulfonate having an average equivalent weight of 350–520 and optionally 0.01–20% by volume cosurfactant (e.g. alcohol) and/or 0.001–5% by weight (based on the aqueous medium) of electrolyte (e.g. inorganic salts). The viscosity of the micellar dispersion is dependent on the amount of water within the micellar dispersion; thus a highly viscous micellar dispersion generally contains less water than a less viscous dispersion. The dispersion is obtained, e.g. by mixing the petroleum sulfonate and hydrocarbon and thereafter adding water to obtain desired viscosity. Electrolyte can be present in the aqueous medium. The cosurfactant, depending upon its solubility, can be present in the hydrocarbon or water.

DESCRIPTION OF THE INVENTION

The term "micellar dispersion" as used herein is meant to include micellar solution, microemulsion, and "transparent" emulsion. Micellar dispersions differ from emulsions in many ways, e.g. the former are thermodynamically stable whereas the latter are not and the former are generally transparent whereas the emulsions are generally opaque. Other differences between micellar dispersions and emulsions are recognized in the art.

The micellar dispersion is composed of hydrocarbon, aqueous medium, petroleum sulfonate, and optionally cosurfactant and/or electrolyte. Examples of volume amounts include about 10% to about 70% of hydrocarbon, about 5% to about 50% or more of aqueous medium, about 5% to about 40% of a petroleum sulfonate, and about 0.01% to about 20% or more of cosurfactant and 0.001 to about 5% or more by weight of electrolyte (based on the aqueous medium). In addition, the aqueous medium of the dispersion can contain viscosity imparting agents to impart desired viscosity characteristic to the dispersion, examples of such agents include high molecular weight (0.5–25 or more million) partially hydrolyzed polyacrylamides, e.g. the Pusher products, trade name of Dow Chemical Co., Midland, Mich.

Examples of useful hydrocarbons include crude oil, partially refined fractions of crude oil and refined fractions of crude oil. Specific examples include side cuts from crude columns, crude column overheads, gas oils, kerosene, heavy naphthas, naphthas, straight-run gasoline, and numerous pure hydrocarbons obtained from crude oil. The unsulfonated hydrocarbon in petroleum sulfonates is also useful as the hydrocarbon; a specific example is unsulfonated gas oil.

The aqueous medium can be soft water, brackish water, or a brine water. It is preferred that the ions within the aqueous medium be compatible with the ions within the subterraneans formation. In addition, the micellar dispersion can be designed to take-up the connate water, e.g. emulsify the connate water, or equilibrate with the connate water or even reject water out of the dispersion.

The petroleum sulfonate, which is also known as an alkyl aryl naphthenic sulfonate, can be monosulfonated or disulfonated, but must be soluble, to some degree, in both oil and water. Preferably, the sulfonate contains a monovalent cation such as sodium or ammonium. The average equivalent weight of the sulfonate can be within the range of about 350 to about 520 and more preferably about 360 to about 450. Combinations of high, low and medium average equivalent weight sulfonates are useful.

Examples of cosurfactants (also known as cosolubilizers and semipolar organic compounds) include alcohols, amino compounds, esters, aldehydes, ketones, and like materials containing 1 to about 20 or more carbon atoms. More preferably, the cosurfactant contains about 3 to about 16 carbon atoms and is an alcohol. Specific examples include isopropanol, n- and iso-butanol, amyl alcohols, primary and secondary hexanols, octanols, and the like alcohols, alkaryl alcohols such as p-nonylphenol and alcoholic liquors including fusel oil. Mixtures of two or more cosurfactants, of different molecular weights or different kinds are useful.

Electrolytes useful in the micellar dispersion are preferably inorganic salts. However, inorganic bases and inorganic acids are also useful. Besides impartiing desired viscosity characteristics, the electrolytes can impart a higher temperature range of thermostability to the micellar dispersion. Examples of useful electrolytes include sodium hydroxide, sodium chloride, sodium sulfate, sodium nitrate, hydrochloric acid, sulfuric acid, ammonium chloride, ammonium hydroxide, potassium chloride, and like materials. Salts within the aqueous medium are also useful as electrolytes within this invention.

As mentioned previously, water is admixed with a mixture of hydrocarbon and petroleum sulfonate to obtain the micellar dispersion. Generally, viscosity increases as the amount of water increases. However, the hydrocarbon, petroleum sulfonate, electrolyte and cosurfactant also influence the viscosity. In addition, viscosity imparting agents, e.g. polyacrylamides, can be incorporated into the aqueous medium to obtain high viscosities. Micellar dispersions having high viscosities, i.e. higher than water, are useful to temporarily block the sand face and prevent drilling fluid loss.

It is intended that equivalents obvious to those skilled in the art be interpreted within the scope of the invention as defined by the specification and appended claims.

What is claimed is:

1. In a process of drilling a well utilizing a circulating drilling fluid, the improvement comprising circulating in said well as the drilling fluid an oil-external micellar dispersion consisting essentially of about 10 to about 70 volume percent liquid hydrocarbon, about 5 to about 40 volume percent of a monovalent cation-containing petroleum sulfonate having an average equivalent weight of about 350 to about 520 and being both oil and water soluble, and about 5 to about 50 volume percent aqueous medium.

2. The process of claim 1 wherein the micellar dispersion comprises about 0.001 to about 5 weight percent electrolyte selected from the group consisting of inorganic salts, inorganic bases and inorganic acids.

3. The process of claim 1 wherein the petroleum sulfonate has an average equivalent weight within the range of about 360 to about 450.

4. The process of claim 1 wherein the micellar dispersion contains about 5 to about 50% by volume of hydrocarbon.

5. The process of claim 1 wherein the liquid hydrocarbon is crude oil.

6. The process of claim 1 wherein the micellar dispersion comprises about 0.01 to about 20% by volume of an alcohol having from 1 to about 20 carbon atoms as a cosurfactant.

7. The process of claim 1 wherein the micellar dispersion contains about 0.01 to about 20% by volume of an alcohol which is isopropanol, n-butanol, i-butanol, amyl alcohol, primary hexanol, secondary hexanol, octanol, p-nonylphenol, fusel oil, and mixtures thereof.

8. The process of claim 1 wherein the aqueous medium contains a high molecular weight partially hydrolyzed polyacrylamide as a viscosity increasing agent.

References Cited

UNITED STATES PATENTS

| | | | |
|---|---|---|---|
| 3,308,068 | 3/1967 | Jones | 252—8.5 X |
| 3,425,940 | 2/1969 | Norton | 252—8.5 |
| 3,330,343 | 7/1967 | Tosch et al. | 166—273 |
| 3,297,084 | 1/1967 | Gogarty et al. | 166—274 |
| 3,275,075 | 9/1966 | Gogarty et al. | 166—274 |
| 3,252,903 | 5/1966 | Crittendon | 252—8.5 |
| 3,254,714 | 6/1966 | Gogarty et al. | 166—274 |
| 3,348,611 | 10/1967 | Reisberg | 166—274 |
| 2,798,851 | 7/1957 | Nelson et al. | 252—8.5 |
| 2,775,557 | 12/1956 | Morgan | 252—8.5 |

HERBERT B. GUYNN, Primary Examiner

U.S. Cl. X.R.

175—65; 252—8.5 P